US008676782B2

(12) United States Patent
Hamada et al.

(10) Patent No.: US 8,676,782 B2
(45) Date of Patent: Mar. 18, 2014

(54) INFORMATION COLLECTION APPARATUS, SEARCH ENGINE, INFORMATION COLLECTION METHOD, AND PROGRAM

(75) Inventors: Seiji Hamada, Sagamihara (JP); Makoto Yamamoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 13/003,875

(22) PCT Filed: Aug. 14, 2009

(86) PCT No.: PCT/JP2009/064362
§ 371 (c)(1),
(2), (4) Date: Jan. 12, 2011

(87) PCT Pub. No.: WO2010/041517
PCT Pub. Date: Apr. 15, 2010

(65) Prior Publication Data
US 2011/0119263 A1    May 19, 2011

(30) Foreign Application Priority Data
Oct. 8, 2008    (JP) .................................. 2008-261848

(51) Int. Cl.
*G06F 17/30* (2006.01)
(52) U.S. Cl.
USPC ........................................................ 707/709
(58) Field of Classification Search
USPC .................... 707/726, 706, 709, 710, 711
See application file for complete search history.

(56) References Cited

U.S. PATENT DOCUMENTS 6,411,952 B1 * 6/2002 Bharat et al. ........................ 1/1
6,418,433 B1 * 7/2002 Chakrabarti et al. ................. 1/1
(Continued)

FOREIGN PATENT DOCUMENTS

EP    1717720 A1    11/2006
JP    9218876 A    8/1997
(Continued)

OTHER PUBLICATIONS

International Preliminary Report for International Application No. PCT/JP2009/064362, May 17, 2011, Total 2 pp.
(Continued)

*Primary Examiner* — Robert Timblin
(74) *Attorney, Agent, or Firm* — Konrad Raynes Davda & Victor LLP; David W. Victor

(57) ABSTRACT

The present invention provides an information collection apparatus, an information collection method, and a program capable of collecting information from information resources on a network effectively as well as a search engine that searches the information resources collected. An information collection apparatus of the present invention that collects information from information resources on a network includes an extraction unit that acquires data from an information resource via the network to extract a link-destination address included in the data, a calculation unit that calculates, by comparing each link-destination address with a collection rule describing a set of addresses qualified for a collection target, a score for each link-destination address that reflects a distance from the set to a link-destination information resource indicated by the link-destination address, and a judgment unit that judges whether the link-destination information resource is to be included in the collection target or not in accordance with the score calculated for the link-destination information resource.

21 Claims, 14 Drawing Sheets

(56) References Cited

U.S. PATENT DOCUMENTS

| | | | |
|---|---|---|---|
| 6,983,282 B2* | 1/2006 | Stern et al. | 707/805 |
| 7,672,943 B2* | 3/2010 | Wong et al. | 707/709 |
| 8,145,710 B2* | 3/2012 | Cowings et al. | 709/205 |
| 2002/0113818 A1 | 8/2002 | Tsuda | |
| 2003/0140152 A1* | 7/2003 | Creig Humes | 709/229 |
| 2004/0083424 A1* | 4/2004 | Kawai et al. | 715/501.1 |
| 2005/0015626 A1* | 1/2005 | Chasin | 713/201 |
| 2005/0086206 A1* | 4/2005 | Balasubramanian et al. | 707/3 |
| 2006/0248059 A1 | 11/2006 | Chi et al. | |
| 2007/0300160 A1* | 12/2007 | Ferrel et al. | 715/744 |
| 2008/0256065 A1* | 10/2008 | Baxter | 707/5 |
| 2009/0019354 A1* | 1/2009 | Jaiswal et al. | 715/224 |
| 2009/0210407 A1* | 8/2009 | Freire et al. | 707/5 |
| 2010/0023850 A1* | 1/2010 | Jagdale et al. | 715/206 |

FOREIGN PATENT DOCUMENTS

| | | | |
|---|---|---|---|
| JP | 2001084258 A | 3/2001 | |
| JP | 2002259407 A | 9/2002 | |
| JP | 2003248696 A | 9/2003 | |
| JP | 2004199365 A | 7/2004 | |
| JP | 2005301759 A | 10/2005 | |
| JP | 2006235729 A | 9/2006 | |
| JP | 2007149057 A | 6/2007 | |

OTHER PUBLICATIONS

Written Opinion for International Application No. PCT/JP2009/064362, May 13, 2011, Total 4 pp.

Alur, N., T.J. Brown, C. Delgado, R. Isaacs, and M. Przepiorka, "WebSphere Information Integrator OmniFind Edition: Fast Track Implementation", "Appendix A. Template for Topology and Configuration Information", "Crawler properties templates", "Web crawler properties template", pp. 566-570, [online], published on Jul. 18, 2005, IBM Corp., [searched on Sep. 29, 2008]. Retrieved from the Internet at <URL: http://www.redbooks.ibm.com/redbooks/pdfs/sg246697.pdf>, Part 1, pp. 1-46.

Alur, N., T.J. Brown, C. Delgado, R. Isaacs, and M. Przepiorka, "WebSphere Information Integrator OmniFind Edition: Fast Track Implementation", "Appendix A. Template for Topology and Configuration Information", "Crawler properties templates", "Web crawler properties template", pp. 566-570, [online], published on Jul. 18, 2005, IBM Corp., [searched on Sep. 29, 2008]. Retrieved from the Internet at <URL: http://www.redbooks.ibm.com/redbooks/pdfs/sg246697.pdf>, Part 2, pp. 47-106.

Alur, N., T.J. Brown, C. Delgado, R. Isaacs, and M. Przepiorka, "WebSphere Information Integrator OmniFind Edition: Fast Track Implementation", "Appendix A. Template for Topology and Configuration Information", "Crawler properties templates", "Web crawler properties template", pp. 566-570, [online], published on Jul. 18, 2005, IBM Corp., [searched on Sep. 29, 2008]. Retrieved from the Internet at <URL: http://www.redbooks.ibm.com/redbooks/pdfs/sg246697.pdf>, Part 3, pp. 107-166.

English Abstract & Machine Translation for JP2001084258A, published Mar. 30, 2001, Total 44 pp.

English Abstract & Machine Translation for JP9218876A, published Aug. 19, 1997, Total 54 pp.

English Abstract for JP2002259407A, published Sep. 13, 2002, Total 1 p [has English counterpart US20020113818].

English Abstract & Machine Translation for JP2004199365A, published Jul. 15, 2004, Total 38 pp.

English Abstract & Machine Translation for JP2005301759A, published Oct. 27, 2005, Total 45 pp.

English Abstract & Machine Translation for JP2006235729A, published Sep. 7, 2006, Total 40 pp.

English Abstract for JP2007149057A, published Jun. 14, 2007, Total 1 p [has English counterparts EP1717720A1 & US2006248059].

English Abstract & Machine Translation for JP2003248696A, published Sep. 5, 2003, Total 38 pp.

Google, Inc., "Administering Crawl for Web and File Share Content: Preparing for a Crawl", "Configuring a Crawl", [online], [Retrieved on Nov. 19, 2010]. published on Jul. 2007, Google, Inc. [Searched on Sep. 29, 2008]. Retrieved from the Internet at <URL: http://code.google.com/apis/searchappliance/documentation/50/admin_crawl/Preparing.html#confh1>, Total 11 pp.

International Search Report for International Application No. PCT/JP2009/064362, Sep. 15, 2009, Total 2 pp.

* cited by examiner

110

| URL | SCORE | TIME-LIMIT |
|---|---|---|
| http://www.example.com/public/index.html | 100 | — |
| http://www.example.com/public/hr/office/index.html | 100 | 20xx/xx/xx xx:xx |
| http://www.example.com/public/peaple/joe/index.html | 100 | 20xx/xx/xx xx:xx |
| http://www.docs.example.com/forms/required.html | 75 | 20xx/xx/xx xx:xx |
| ⋮ | ⋮ | ⋮ |
| http://www.example.com/private/secret.html | 0 | 20xx/xx/xx xx:xx |
| ⋮ | ⋮ | ⋮ |
| 110a | 110b | 110c |

| URL | INDEX INFORMATION | SCORE |
|---|---|---|
| http://www.example.com/public/index.html | ・・・・ | 100 |
| http://www.example.com/public/hr/office/index.html | ・・・・ | 100 |
| http://www.example.com/public/peaple/joe/index.html | ・・・・ | 100 |
| http://www.docs.example.com/forms/required.html | ・・・・ | 75 |
| ⋮ | ⋮ | ⋮ |
| 120a | 120b | 120c |

FIG. 4B

INFORMATION COLLECTION APPARATUS, SEARCH ENGINE, INFORMATION COLLECTION METHOD, AND PROGRAM

FIELD OF THE INVENTION

The present invention relates to an information collection technique, and more particularly relates to an information collection apparatus, an information collection method, and a program to collect information from information resources on a network as well as a search engine that searches information resource from which information has been collected.

BACKGROUND OF THE INVENTION

Conventionally, a web crawler is a software component configured to make the rounds of information resources on a network such as the Internet or an enterprise network while following links to collect webpages regularly, so as to create a database and an index for a search engine. Normally, the web crawler keeps, as configuration information, URL information on an information resource serving as a starting point for the collection and a URL pattern limiting the range of URLs as a collection target.

According to conventional techniques, before operating the crawler, an administrator considers the configuration of a web site as a target to set the URL pattern as a collection rule, and classifies URLs allowed as the collection target and URLS forbidden explicitly (Non-Patent Document 1, Non-Patent Document 2). Then, the web crawler follows the links while judging whether an URL of a link destination included in an acquired webpage is allowed or not in accordance with the collection rule set by the administrator, so as to collect webpages. The web crawler further makes the rounds regularly to update the database and the index.

In the case where there is a link or a transfer occurs to a webpage that is not designated explicitly by the collection rule, and when the destination page is to be collected, the administrator manually adds to the above-stated collection rule to set a rule so as to include the destination page in the collection target during maintenance, for example.

As described above, the conventional web crawler uses the URL information on an information resource used as a starting point for the collection and the URL pattern limiting the range of URLs as a collection target, so that the target range of URLs can be limited. Another known method of limiting the range of information resources on a network is based on the number of links along the link path or the number of hops.

For instance, for the purpose of rating and filtering of a target page using link path information effectively and appropriately, Japanese Patent Application Publication No. 2003-248696 (Patent Document 1) discloses the technique of storing, in a DB unit, hyperlink information including link path information coupling URLs of the respective reference pages, making a path search unit search the link path information stored in the DB unit based on a target page, making a page score calculation unit perform rating as to whether the target page agrees with a predetermined standard with reference to the link path information stored in the database, and performing filtering of the target page based on this rating result.

[Patent Document 1] Japanese Patent Application Publication No. 2003-248696

[Non-Patent Document 1] N. Alur, T. J Brown, C. Delgado, R. Isaacs, M. Przepiorka, Redbooks "WebSphere Information Integrator OmniFind Edition: Fast Track Implementation", "Appendix A. Template for topology and configuration information", "Crawler properties templates", "Web crawler properties template", pp. 566-570, [online], published on Jul. 18, 2005, International Business Machines Corporation, [searched on Sep. 29, 2008], Internet<URL=http://www.redbooks.ibm.com/redbooks/pdgs/sg246697.pdf>

[Non-Patent Document 2] "Administering Crawl for Web and File Share Content", "Preparing for a Crawl", "Configuring a Crawl", [online], published in July, 2007, Google Inc. [searched on Sep. 29, 2008], Internet<URL=http://code.google.com/apis/searchappliance/documentation/50/admin_crawl/Preparing.html#confh1>

As described above, a web crawler makes the rounds of information resources and collects webpages in accordance with a range of collection targets specified by a collection rule, thus keeping a database and an index up to date to enable a search by end-users. However, when there is a link to a webpage not designated explicitly by the collection rule or a transfer to such a webpage occurs, the administrator has to recognize the occurrence of the link or the transfer and then has to manually set the collection rule to make the destination page a collection target as illustrated in FIG. 12, for example, thus increasing burden on the administrator to maintain the collection rule.

Further, in case of changing the setting of the collection rule as described above, if the collection rule is changed in insufficient detail, the collection range might include an unnecessary file also. On the other hand, when the collection rule is set in detail so as to exclude such an unnecessary file, the collection rule obtained will be complicated, thus increasing burden on the administrator to maintain the collection rule. Further, setting the configuration information of a crawler has to follow the full understanding of the site configuration enough to enable distinguishing between necessary pages and unnecessary pages.

As illustrated in FIG. 13, on a web site, there is a webpage including a frame that outputs directly a webpage on another server. In such a page configuration, in order to configure an information resource on this another server as a collection target, the administrator is required to acquire an URL of each frame to set a collection rule. In general, a URL of a frame set only is described in an address bar on a browser, and therefore a source of a webpage has to be viewed or communication analysis has to be performed to set a collection rule additionally, thus requiring administrator's labor.

Further, when the setting of the collection rule is changed manually as described above, the following problem might occur. As illustrated in FIG. 14, even when the relevance of a page, which has been made a collection target by the newly added rule, with a page included in a collection range originally and explicitly is lowered due to a change in the site configuration, unnecessary pages would be collected continuously until this additional rule is appropriately changed or deleted. Then, a processing resource that is to be allocated to collect necessary pages is lost, and the processing efficiency for information collection is degraded in the conventional crawler. Moreover, even when the administrator tries to change or delete the added rule, a change in the site configuration has to be monitored, and the changing or deleting operation has to be conducted manually, thus increasing a load on the administrator to maintain the collection rule.

In order to specify the range of information resources on a network, the technique disclosed in the above-stated Patent Document 1 is available, for example. This technique is to record links among all pages and to decide a target of filtering using the number of pages or the number of links to reach a target page. In the technique of Patent Document 1, a reachable page is judged based on the number of links or the number of hops only, so that a domain configuration such as an in-house network cannot be considered. Further, the overall link configuration has to be kept for the judgment, thus requiring a lot of resources, so that this technique is not sufficient for specifying the range of target information resources in terms of the processing efficiency.

That is, it has been desired to develop a web crawler capable of expanding the collection range up to a flexible and appropriate range and coping with a change that might involve a change in the information resources to be included in the collection target, such as a change in the site configuration.

SUMMARY OF THE INVENTION

In view of the above-stated problems, it is an object of the present invention to provide an information collection apparatus, an information collection method, and a program as well as a search engine that searches information resource from which information has been collected, which are capable of flexibly expanding its collection range to an appropriate range without making the setting of a collection rule by an administrator complicated, while suppressing a decrease in the collection efficiency of collection targets designated explicitly, and capable of coping with a change in environment to change relevance between information resources greatly such as a change in the site configuration.

In order to cope with the above-stated problems, according to the present invention, a link-destination address included in the data acquired from the information resource via the network is extracted, and a score is calculated by comparing each extracted link-destination address with a given collection rule describing a set of addresses qualified for a collection target. The score reflects a distance from the set to a link-destination information resource indicated by the link-destination address. Then, a judgment is made whether the link-destination information resource is to be included in the collection target or not in accordance with the score calculated for the link-destination information resource.

With this configuration, even for an address that is outside the specification of the collection rule describing a set of qualified addresses for the collection target designated explicitly by the administrator, for example, the address can be associated with a score reflecting a distance from the set, so that the information resource designated by the address can be included in the collection target. Therefore, the collection range can be expanded to an appropriate range in accordance with relevance between the information resources, so that effective information collection can be realized. Especially, the present invention is configured so that a page having a high degree of relevance with the explicitly designated site can be collected even when the administrator does not recognize it, and therefore the collection target can be managed effectively without increasing the set collection rule, thus making it easy for the administrator to set and mange the collection rule.

Further, according to the present invention, a difference is determined in accordance with a degree of fitness of the link-destination address to address representation included in the collection rule with reference to the score calculated for link-origin information resource to calculate the score for the link-destination information resource. With this configuration, the score can be calculated with reference to the score calculated for the link-origin information resource, and therefore the score for the link-destination information resource can be calculated even when the overall link information is not kept, and therefore a resource for score calculation can be minimized. Further, a difference in score between the link-origin and the link-destination can be determined in accordance with a degree of fitness of the link-destination address to address representation included in the collection rule, thus enabling scoring in accordance with a site characteristic of the link-destination that the address reflects, whereby the collection range can be expanded as the administrator intends.

Further, according to the present invention, a time-limit can be set for the calculated score, and when scores have been already calculated for the link-destination information resource, a maximum valid score can be used. With this configuration, it is possible for the score to reflect the shortest distance along the effective link path from the link-destination information resource to the set. In other words, even when the previous effective shortest path is broken due to deletion of an information resource, for example, it is possible to calculate an appropriate score along the next effective path and judge that it is to be included in the collection target or not. Further, when all of the paths from the set are broken, they can be excluded from the collection target after the time-limit has been elapsed, thus making it possible to correspond to a change in the relevance between information resources over time.

Further, according to the present invention, when the score calculated for the link-destination information resource or the time limit thereof is outside a range to be included in the collection target or a collection target candidate, the link-destination information resource can be excluded from the collection target or the collection target candidate to release a resource for collection. With this configuration, an information resource with lowered relevance can be judged automatically based on the score or the time-limit thereof, and a resource allocated to collect such a resource can be released. Thus, delay in information collection of other required information resources can be preferably prevented.

According to the present invention, the difference can be determined in accordance with at least one of a degree of agreement between a domain name included in the link-destination address and a domain name included in an element of the set of qualified addresses, a degree of agreement between a path portion included in the link-destination address and a path portion included in an element of the set of qualified addresses, the number of links from the link-origin information resource, and whether the link-destination address is on an in-house network or not.

With this configuration, the difference in score can be decreased for a link-destination information resource on the same server as that of the server of the qualified address set designated explicitly by the administrator or for a link-destination information resource on a server in an adjacent domain, for example, or the difference in score can be increased for a link-destination information resource on a server external to an in-house network. Further, the difference in score can be increased or decreased in accordance with a degree of agreement in path portions of addresses or the number of links from the link-origin information resource. In this way, in accordance with a site characteristic of the link-destination represented by the address itself or a characteristic of the link-origin information resource, the collection range can be expanded so as to further reflect a user's intention. By setting the increase/decrease amount, the expansion range for collection can be managed flexibly.

Further, according to the present invention, when it is judged that a link-destination information resource that is not included in the set described in the collection rule is to be included in the collection target, address representation including at least a part of a domain name and a path included in a link-destination address of the link-destination information resource can be kept as a candidate for an additional collection rule. With this configuration, an additional collection rule on a site with a higher relevance, which the administrator does not recognize at the beginning, can be kept as a candidate, and therefore the administrator can recognize the site easily, thus making it easy to change the setting of the collection rule.

Further, according to a search engine of the present invention, in response to a search request from a client, information resources included in an inquiry set of the search request can be ranked using the score calculated, and a search result can be returned. With this configuration, the search result can be ordered based on distances from a set of qualified addresses for the collection target designated explicitly by the administrator, for example.

The distance from the set to the link-destination information resource can be the total sum of link lengths along the respective links, where the link length corresponds to a degree of agreement between address representation included in the collection rule and the extracted link-destination address. The above-stated collection rule can include representation of allowed addresses that explicitly designate qualified addresses and forbidden addresses that explicitly designate unqualified addresses.

BRIEF DESCRIPTION OF THE DRAWINGS

FIG. 4 illustrates data configurations of a rounding-destination table (A) and of a search index (B) kept by the search server according to Embodiment 1 of the present invention.

BEST MODE FOR CARRYING OUT THE INVENTION

The following describes the present invention by way of embodiments, which does not intend to limit the present invention to the following embodiments. In the following embodiments, a search server 20 is exemplified that collects a webpage from an information resource on a network and performs indexing for a search, while addressing a search request from a client computer (hereinafter referred to as a client) 18.

Embodiment 1

Figure 1:
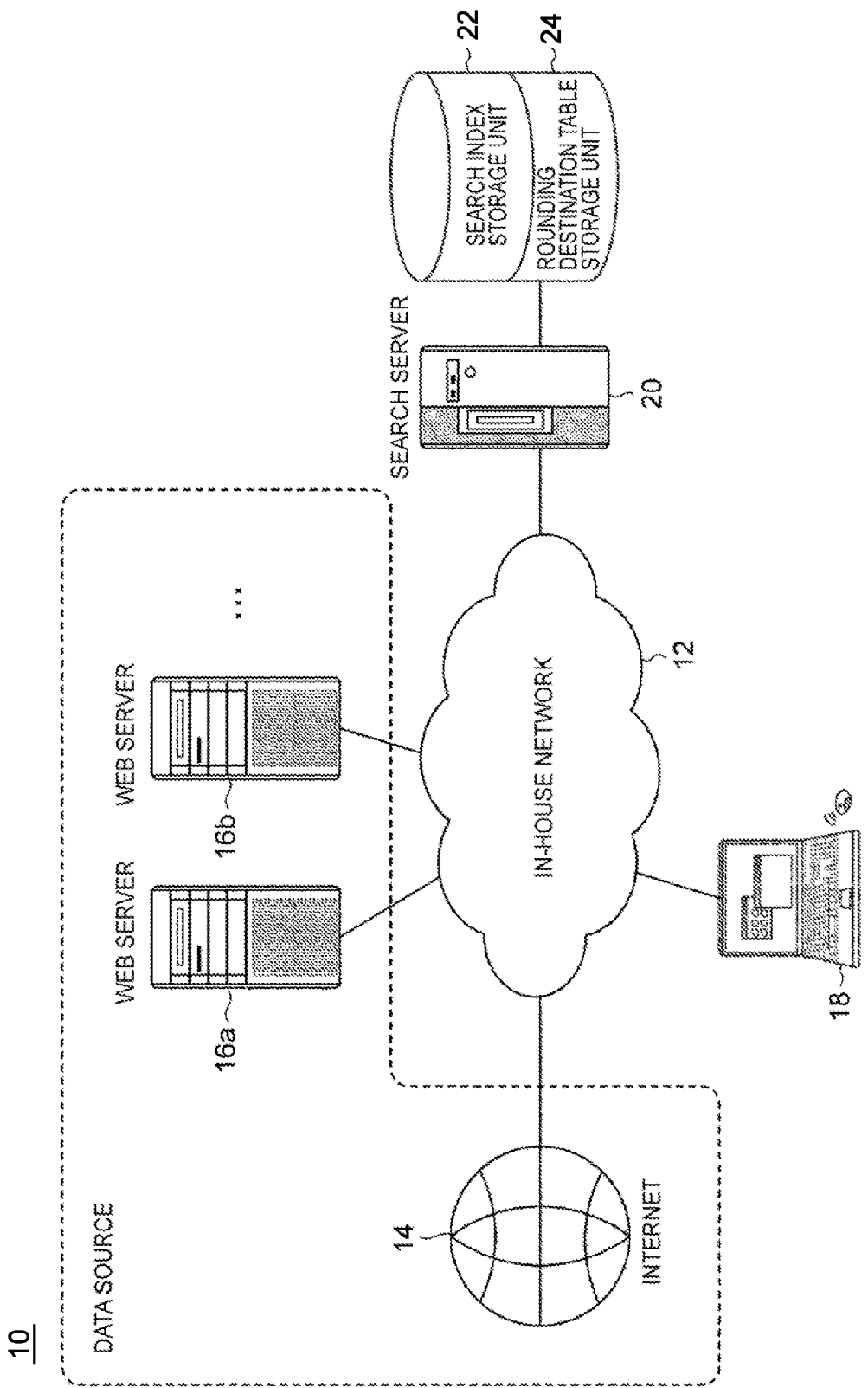
FIG. 1 schematically illustrates a search system including a search server according to Embodiment 1 of the present invention.

FIG. 1 schematically illustrates a search system 10 including a search server 20 according to Embodiment 1 of the present invention. The search system 10 illustrated in FIG. 1 includes the search server 20 connected with an in-house network 12. The in-house network 12 may be configured as a local area network (LAN) using TCP/IP and Ethernet®, or a Wide Area Network (WAN) using Virtual Private Network (VPN) or a leased line, for example, and is connected with the Internet 14 and web servers 16a and 16b, for example.

In accordance with a given collection rule, the search server 20 collects a webpage from an information resource on the network while following a link with a designated webpage used as a starting point. The collected webpage is subjected to syntax analysis and indexing in order to respond to a search request from a client, whereby a search index is created and stored in a storage unit 22 (hereinafter referred to as a search index storage unit). The search server 20 further stores, in a storage unit 24 (hereinafter referred to as a rounding-destination table storage unit), a rounding-destination table where an address of an information resource as a candidate for a collection target is registered, so as to register a new collection target found out in accordance with the collection rule. This rounding-destination table functions as a queue during the collection. This address may be a Uniform Resource Identifier (URI) indicating an information resource on the network, more specifically, a Uniform Resource Locator (URL) or a Uniform Resource Name (URN), for example. In the present embodiment, the following describes using a URL.

Data collected from the information resource may include the above-stated webpage described in HyperText Markup Language (HTML), which is not an especially limiting example. Other types of data collected from the information resource may include data in a format allowing data to include a hyperlink indicating other data, e.g., an eXtensible Markup Language (XML) document described in XML or XML Linking Language (XLink), a document including a hyperlink, a spread sheet, a presentation, a mail document and the like. Still other types of data collected from the information resource may be a multimedia file such as image, audio and video.

The above-stated search server 20 is generally configured as a general-purpose computing device such as a personal computer, a work station, a mid-range, or a main frame. More specifically, the search server 20 includes a central processing unit (CPU) such as a single-core processor or a multi-core processor, a cache memory, a RAM, a network interface card (NIC), a storage device connected via a storage interface, and the like. The NIC allows the search server 20 to connect with the in-house network 12 using an appropriate communication protocol such as TCP/IP at a physical layer level or at a link layer level. The storage device provides a storage area to store various types of data required by the search server 20.

The search server 20 is controlled by an operating system (hereinafter referred to as an OS) such as WINDOWS® 200X, UNIX®, LINUX®, or z/OS®, implements a database management system (DBMS) such as DB2®, Oracle® Database Microsoft® SQL Server®, or the like, and embodies the rounding destination table storage unit 24 and the search index storage unit 22 as a database in the above-stated storage area provided by the storage device. The rounding destination table and the search index are stored on the database in a format accessible from a computer.

Each web server 16 is configured using Apache HTTP Server, Microsoft® Internet Information Services or the like, and provides an information resource as a potential collection target. Each web server 16 has a unique domain name given thereto with a domain in the in-house network used as a parent domain, so that the web server 16 responds to an acquisition request for data with respect to an information resource designated by a path portion of a URL or a query character string. Servers not illustrated also exist on the Internet 14, each of which has a configuration similar to that of the web server 16, and information resources on these servers can be a potential collection target. The above-stated web server 16 also can be configured as a general-purpose computing device similar to the search server 20.

The search server 20 implements server programs such as CGI (Common Gateway Interface), SSI (Server Side Include), servlet, and web application, and is configured to process a search request from the client 18 using a HTTP protocol and return a search result. The client 18 can be configured as a general-purpose computing device implementing a web browser, a plug-in and the like or as a mobile terminal device such as a PDA or a mobile phone, and issues a search request to the search server 20 and acquires a search result.

Figure 2:
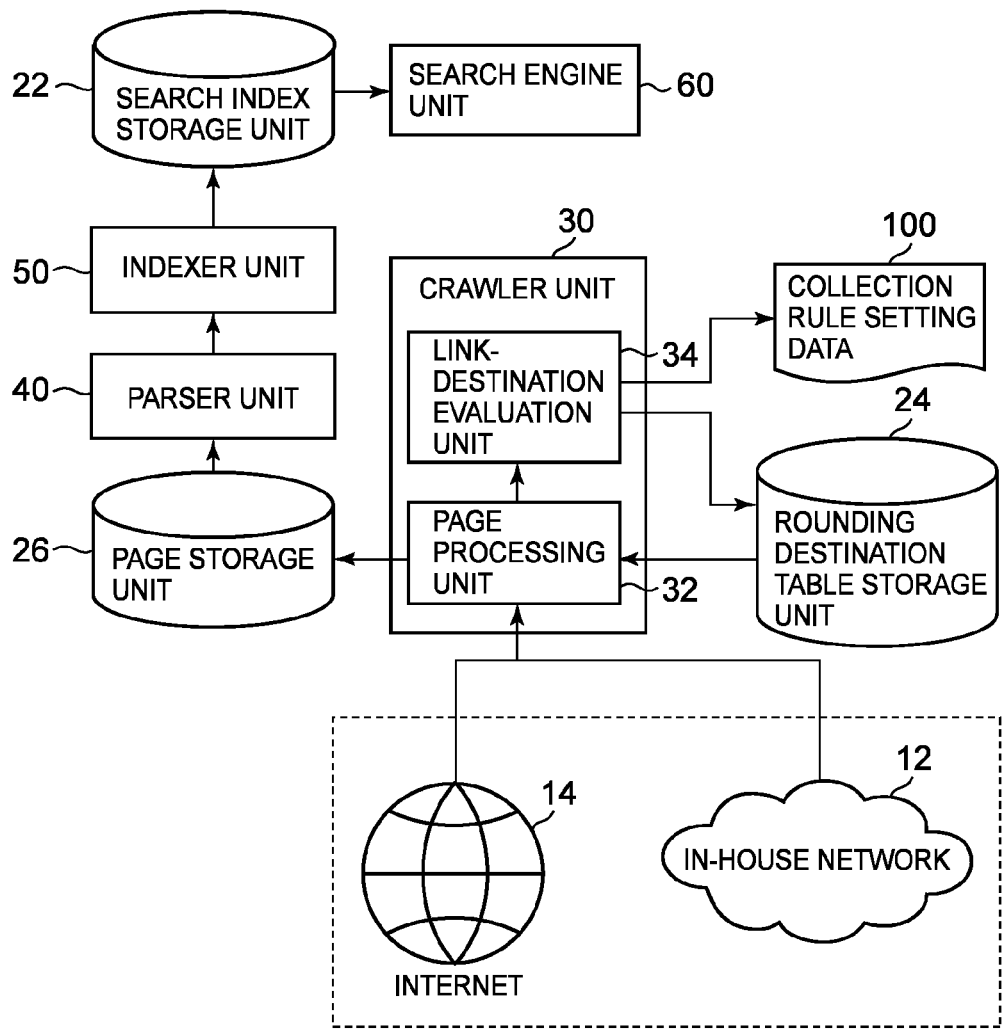
FIG. 2 is a functional block diagram of the search server according to Embodiment 1 of the present invention.

FIG. 2 shows functional blocks embodied on the search server 20 according to Embodiment 1 of the present invention. Each functional unit (the details described later) included in the search server 20 may be implemented by reading out a program from a computer-readable recording medium, deploying the program on a memory, and executing the program to operate and control each hardware resource. In FIG. 2, the in-house network 12 and the Internet 14, which are outside of the search server 20, are illustrated within dotted lines.

The search server 20 includes a crawler unit 30 that collects a webpage from an information resource on a network. The crawler unit 30 reads out URLs one by one registered in a rounding-destination table stored in the rounding destination table storage unit 24, and accesses an information resource indicated by a URL as a collection target to acquire a webpage. The crawler unit 30 further identifies a hyperlink appropriately from the acquired webpage, judges an information resource to be a candidate for the collection target in accordance with a collection rule and an evaluation method set beforehand, and registers the same in the rounding-destination table.

Figure 3:
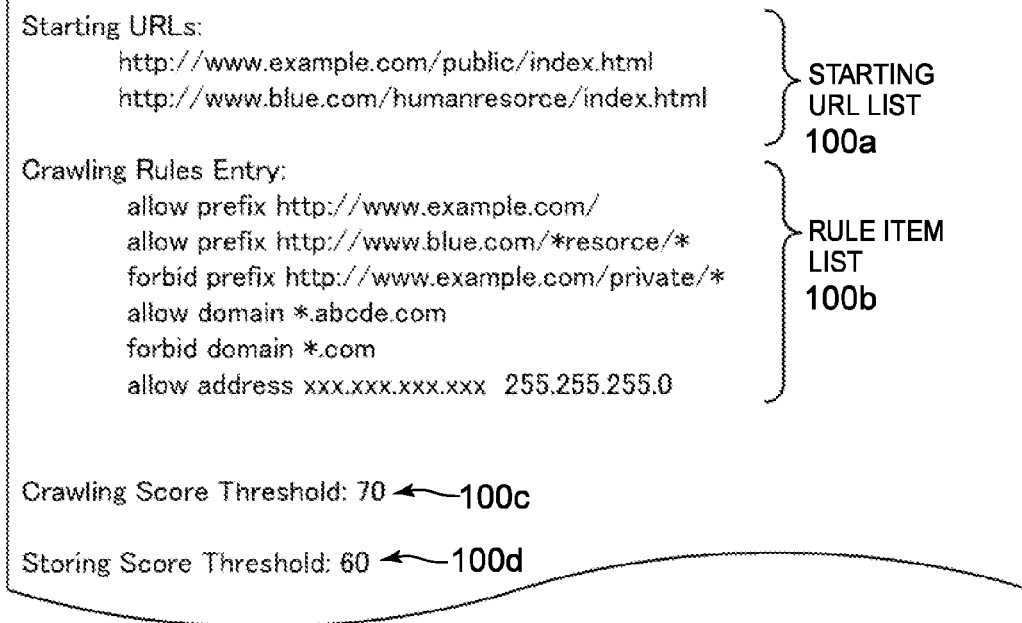
FIG. 3 illustrates a data configuration of collection rule setting data kept by the search server according to Embodiment 1 of the present invention.

URLs used as starting point for the collection and the collection rule are described in collection rule setting data 100 that the crawler unit 30 refers to. FIG. 3 illustrates a data configuration of the collection rule setting data 100 kept by the search server 20 according to Embodiment 1 of the present invention. The collection rule setting data 100 kept as setting information of the crawler unit 30 includes an starting URL list 100*a* in which starting URLs are registered, and a rule item list 100*b* in which a collection rule that describes a set of qualified URLs for the collection target is registered. The URLs registered as starting points are firstly registered in the rounding-destination table in the rounding destination table storage unit 24.

Each item of the collection rule describes a set of qualified URLs for the collection target intentionally, which may include an allowed address pattern (allow) that is allowed explicitly as the collection target or a forbidden address pattern (forbid) that is forbidden explicitly. As an address pattern of each item, a prefix of an address described using HTTP or HTTPS scheme, and a character string represented using a wild card, a range specification, or a regular expression of a domain or an IP address may be used, for example, which are not especially limiting examples.

The priority among these items is not especially limited as long as it is possible to determine whether a set of qualified URLs as the collection target can be uniquely defined by a plurality of items and any URL can be specified as to whether it is allowed or forbidden explicitly, or not defined. For instance, a rule can be appropriately provided for a setting order of the items, specific details of an address pattern and the like. The collection rule setting data 100 may further specify extensions to be collected and extensions to be excluded, for example.

Referring back to FIG. 2, the crawler unit 30 more specifically includes a page processing unit 32 and a link-destination evaluation unit 34 as a sub-module. The page processing unit 32 acquires a webpage from an information resource as the collection target, performs an HTML syntax analysis to the page to identify a hyperlink embedded in the page and extract a URL of the link destination, and passes the same to the link-destination evaluation unit 34. The acquired webpage is stored in a page storage unit 26 for indexing. The page processing unit 32 functions as an extraction unit of the present embodiment.

The link-destination evaluation unit 34 calculates a score for an information resource indicated by each of the extracted link-destination URLs in accordance with a predetermined evaluation method while comparing each link-destination URL with each item of the collection rule specified by the collection rule setting data 100. The method for evaluating the score will be described later in detail. The link-destination evaluation unit 34 functions as a calculation unit of the present embodiment.

Referring again to FIG. 3, the collection rule setting data 100 further includes a threshold 100*c* for inclusion of a calculated score in the collection target and a threshold 100*d* for inclusion of the calculated score in a candidate for the collection target. The link-destination evaluation unit 34 illustrated in FIG. 2 compares a score calculated for each of the extracted link-destination URLs with the threshold 100*d*, thus judging whether or not the information resource indicated by the link-destination URL is to be included in a candidate for the collection target. Then, for the information resource as a candidate for the collection target, a time-limit for the score is determined, and the URL, the score and the time-limit thereof are registered in the rounding-destination table. The time-limit set for the score preferably can be a date and time with a predetermined margin provided based on the next scheduled collection time and date of the webpage at the link-origin.

FIG. 4A illustrates a data configuration of a rounding-destination table 110 kept by the search server 20 according to Embodiment 1 of the present invention. The rounding-destination table 110 illustrated in FIG. 4A includes a field 110*a* in which URLs of information resources as candidates for the collection target are input, a field 110*b* in which the calculated scores are input, and a field 110c in which time-limits for the scores are input. The rounding-destination table 110 may be configured so that data are sorted based on the field 110b including scores and the rounding is performed while giving priority to information resources with larger scores.

The threshold 100c illustrated in FIG. 3 is used for a comparison made when the crawler unit 30 functioning as a judgment unit in the present embodiment reads out a record registered in the rounding-destination table 110. The crawler unit 30 reads out records in the rounding-destination table 110 illustrated in FIG. 4A one by one, and refers to a score and a time-limit thereof to make a judgment whether or not the information resource indicated by a URL thereof is to be a collection target to acquire a webpage. The acquired webpage is stored in the page storage unit 26, and preferably the score thereof also is associated and stored in the page storage unit 26 in order to utilize the score during a search.

Figure 5:
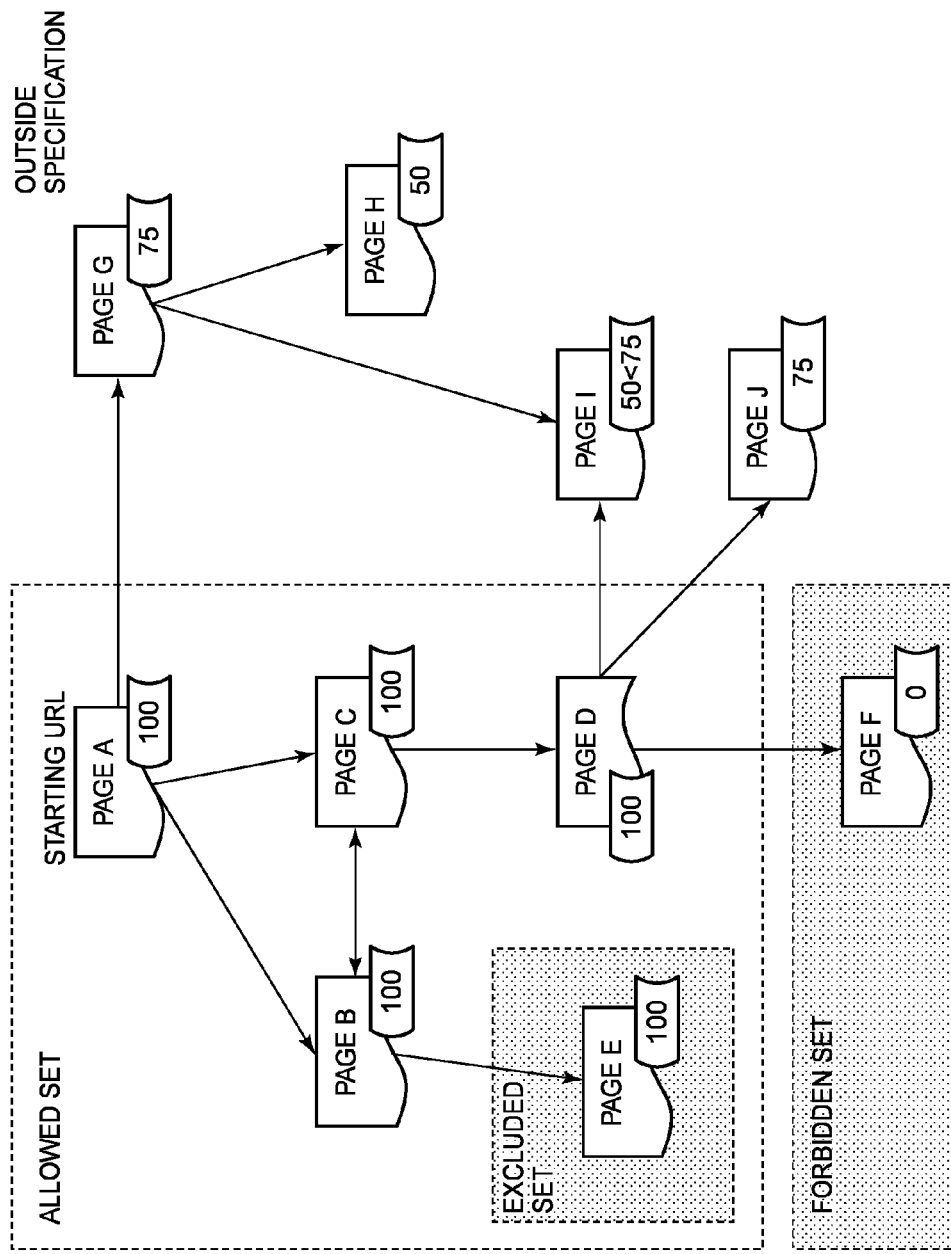
FIG. 5 schematically illustrates a score evaluation method for link-destination information resources according to Embodiment 1 of the present invention.

Referring now to FIG. 5, the following describes a score evaluation method for link-destination information resources. FIG. 5 schematically illustrates the score evaluation method for link-destination information resources. In FIG. 5, a plurality of webpages A to J (hereinafter simply referred to as pages) are illustrated as information resources indicated by a URL. Each of these pages A to J exists on one of a region for an allowed set specified by an allowed address pattern in the collection rule setting data 100, a region for a set excluded from the allowed set by a forbidden address pattern, a region for a forbidden set specified by the forbidden address pattern, and a region beyond the specification.

Each page A to J is linked to another page via a hyperlink indicated by a solid line, and the crawler unit 30 follows the hyperlink from a page A indicated by an starting URL, and calculates scores for pages at link destinations one by one. As illustrated in FIG. 5, the maximum score indicated by "100" is allocated to each of pages A to D as elements of the allowed set. On the other hand, the minimum score indicated by "0" is allocated to each of pages E and F included in the set specified by the forbidden address pattern. A set obtained by removing the set specified by the forbidden address pattern from the allowed set makes up a set of qualified URLs for the collection target specified by the rule item list 100b.

An intermediate value is calculated and allocated to each of pages G to J existing outside the regions specified explicitly by the respective items of the collection rule. In the example illustrated in FIG. 5, page G, which is located at a region outside the specification directly linking from page A, has a score "75" allocated thereto, obtained by subtracting a subtraction amount "25" from the maximum score "100" allocated to the allowed set. Page H, which links further from page G outside the specification, has a score "50" obtained by further subtracting the subtraction amount "25".

Meanwhile, page I outside the specification is linked from both of page D as an element of the allowed set and page G outside the specification. In this case, priority is given to a score "75" calculated for the direct link from page D over a score "50" for via page G because "75" is larger than "50".

According to the score evaluation method schematically illustrated in FIG. 5, the above-stated score is determined by subtracting a predetermined subtraction amount for each passing link from a page included in a set of qualified URLs for the collection target to a page as the evaluation target. That is, when the predetermined subtraction amount corresponds to a link length, the score will reflect a distance defined as a total sum of link lengths of passing links from the set of qualified URLs to the evaluation target page. In the example illustrated in FIG. 5, the link length, i.e., the subtraction amount is a fixed value. However, this may be a value in accordance with a characteristic of a site as a link destination as described later.

In the present embodiment, the collection rule describes the allowed address pattern and the forbidden address pattern, to which the maximum score and the minimum score are allocated, respectively. However, the correspondence between the collection rule and the scores is not limited especially to the above example, and a method of designating a score directly to an address pattern of the collection rule also is possible.

Figure 6:
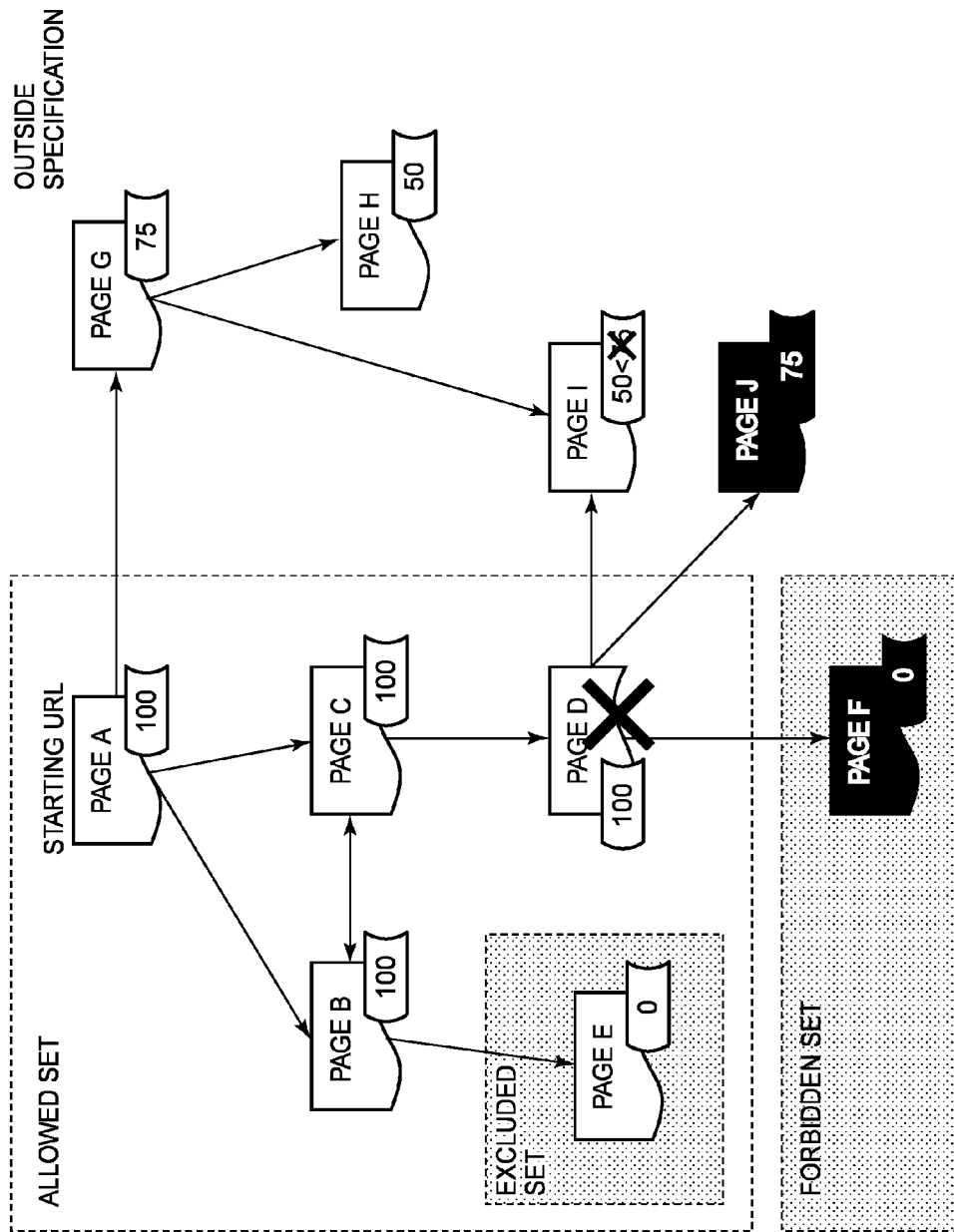
FIG. 6 schematically illustrates a method for updating a score calculated for an information resource at a link destination according to Embodiment 1 of the present invention.

Referring now to FIG. 6, a function of the time-limit set for a score will be described below. FIG. 6 schematically illustrates a method for updating a score calculated for an information resource at a link destination. In the example illustrated in FIG. 6, page D is deleted because of a change in the site configuration or the like between the time when the crawler unit 30 makes the rounds of pages A to D illustrated in FIG. 5 and the time when the next collection processing starts.

As illustrated in FIG. 6, when page D collected before is deleted, links to page F and page J are broken in this example. Therefore, as for page F and page J, when the time-limit assigned thereto when page D is acquired last time and a score thereof is calculated is expired, then the time-limit is no longer updated because a score cannot be calculated. Thus, when a page at a link origin is deleted and a time-limit preferably set based on the next scheduled updating date and time of the link origin is expired, a record corresponding to the information resource will be deleted from the rounding-destination table 110, and the corresponding data also will be deleted from the page storage unit 26.

Meanwhile, when page D is deleted, a link from page D to page I also is broken. However, in the example illustrated in FIG. 6, there is another link from page G to page I, and therefore a score of page I is recalculated when page G is collected, and a time-limit also is updated. Thus, the score of page I is updated to the score "50" calculated for the route via page G, and preferably is set based on the next scheduled updating time and date of page G.

By setting a time-limit for a score and giving priority to the maximum score when different scores are calculated for a plurality of link paths existing, every time rounding is made for collection, it is possible for the score to reflect the shortest distance along the effective link path to the link destination page. In other words, it is possible to correspond to a change in link configuration between pages over time. Herein the present embodiment is configured to recalculate a score reflecting the shortest distance along the effective link path at the time when the rounding is made again for collection. However, in another embodiment, it may be configured so that a plurality of sets of scores and time-limits are kept, and when one of the time-limits is expired, a larger effective score among the remaining scores is adopted.

Further, by setting a time-limit for a score, even when a page is once registered as the collection target, the page can be deleted sequentially if the accessible route is broken. Therefore, a page with a lowered relevance can be judged automatically based on a score or a time-limit thereof, and a resource allocated to collect such a page can be released. Thus, delay in information collection of other required pages can be preferably prevented.

Referring again to FIG. 2, the search server 20 further includes a parser unit 40, an indexer unit 50, and a search engine unit 60. The parser unit 40 reads out a webpage collected in the page storage unit 26 by the crawler unit 30, performs a processing to remove a tag, for example, and further a character string analysis processing such as morpheme analysis, and passes the analysis result with the calculated score to the indexer unit 50. The indexer unit 50 performs indexing using the passed analysis result to create a search index and stores the same in the search index storage unit 22.

FIG. 4B illustrates a data configuration of a search index 120 kept by the search server 20 according to Embodiment 1 of the present invention. The search index 120 illustrated in FIG. 4B includes a field 120*a* in which URLs of information resources as the collection target are input, a field 120*b* in which index information created by the indexing is input, and a field 120*c* in which the calculated scores are input. The search index actually subjected to the search processing preferably is configured as a data configuration of an inverted index including information indicating occurrence positions of words in the webpage, to which the above-stated scores are added as additional information.

The search engine unit 60 refers to the search index including the above-stated scores as additional information, and processes a search request from the client. The information resources included in the search result to be returned to the client are ranked using the scores so as to employ lower ranking as being farther from the above-stated set of qualified URLs designated explicitly.

The search server 20 illustrated in FIG. 2 is configured so that cooperation of hardware and software provides all functions of a function as a crawler that collects information from information resources on the web server 16 and the Internet 14, a function as an indexer that performs indexing to the collected information, and a function as a search engine that returns a search result in response to a search request from a client. However, in another embodiment, the function as the crawler may be configured separated from the other functions, and the above embodiment is not an especially limiting one.

Figure 7:
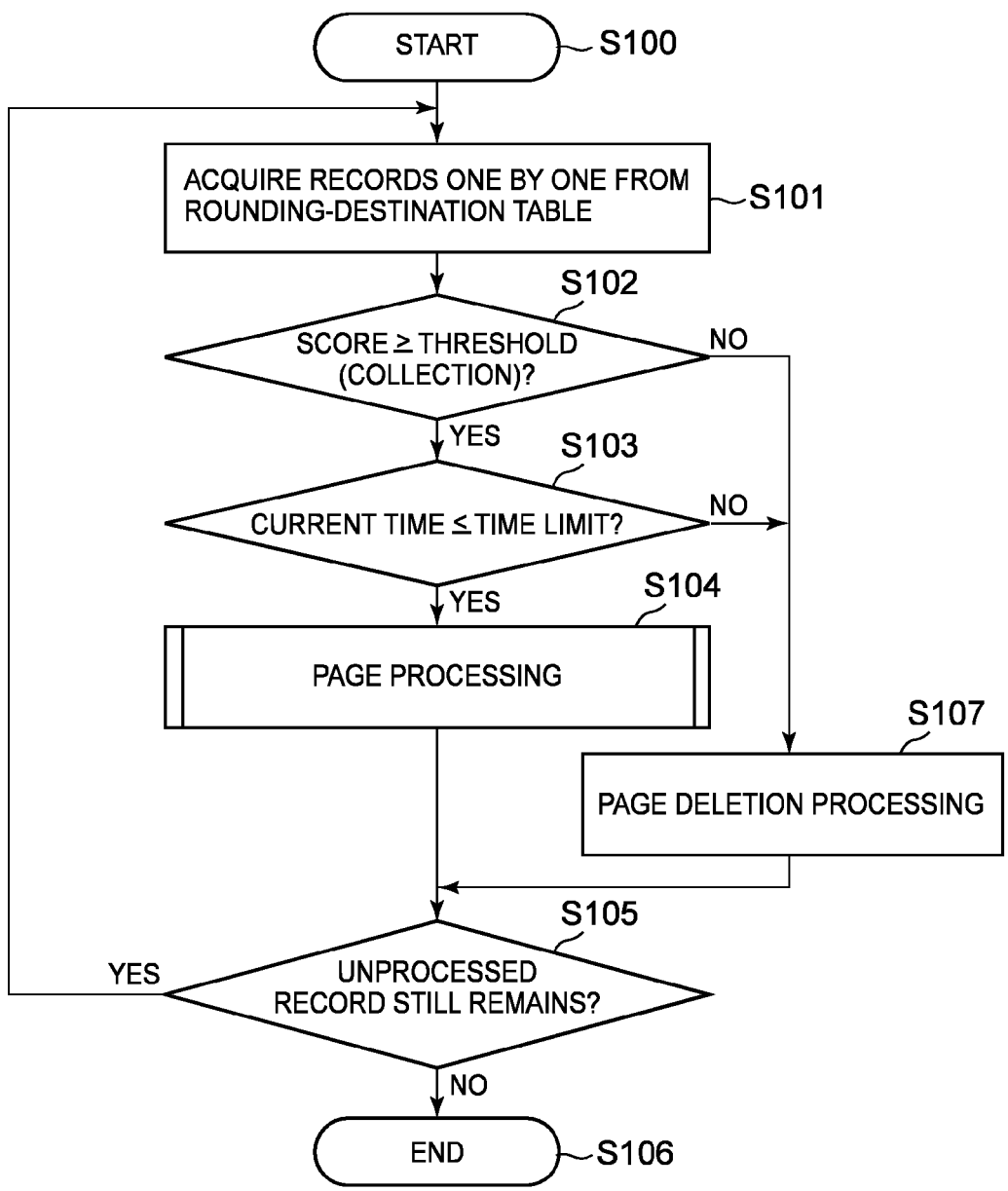
FIG. 7 is a flowchart of a collection processing executed by a crawler unit according to Embodiment 1 of the present invention.
Figure 8:
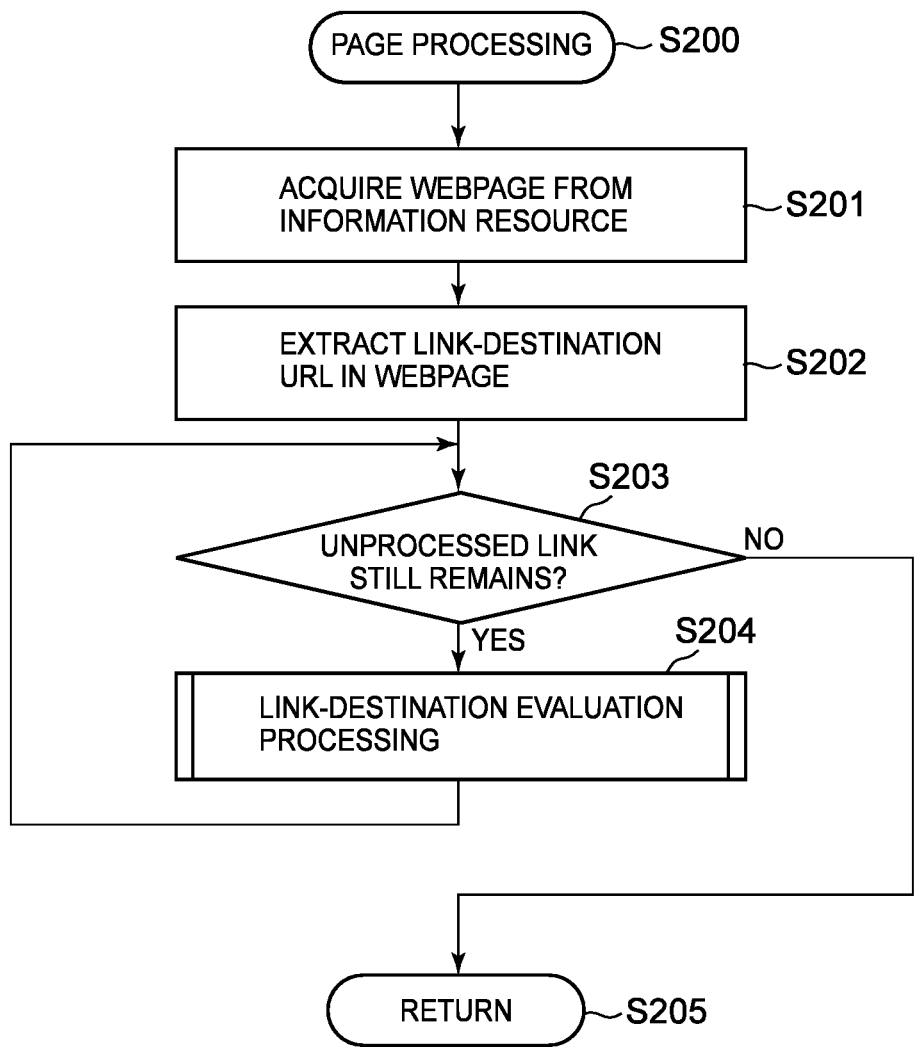
FIG. 8 is a flowchart of a page processing executed by a page processing unit according to Embodiment 1 of the present invention.
Figure 9:
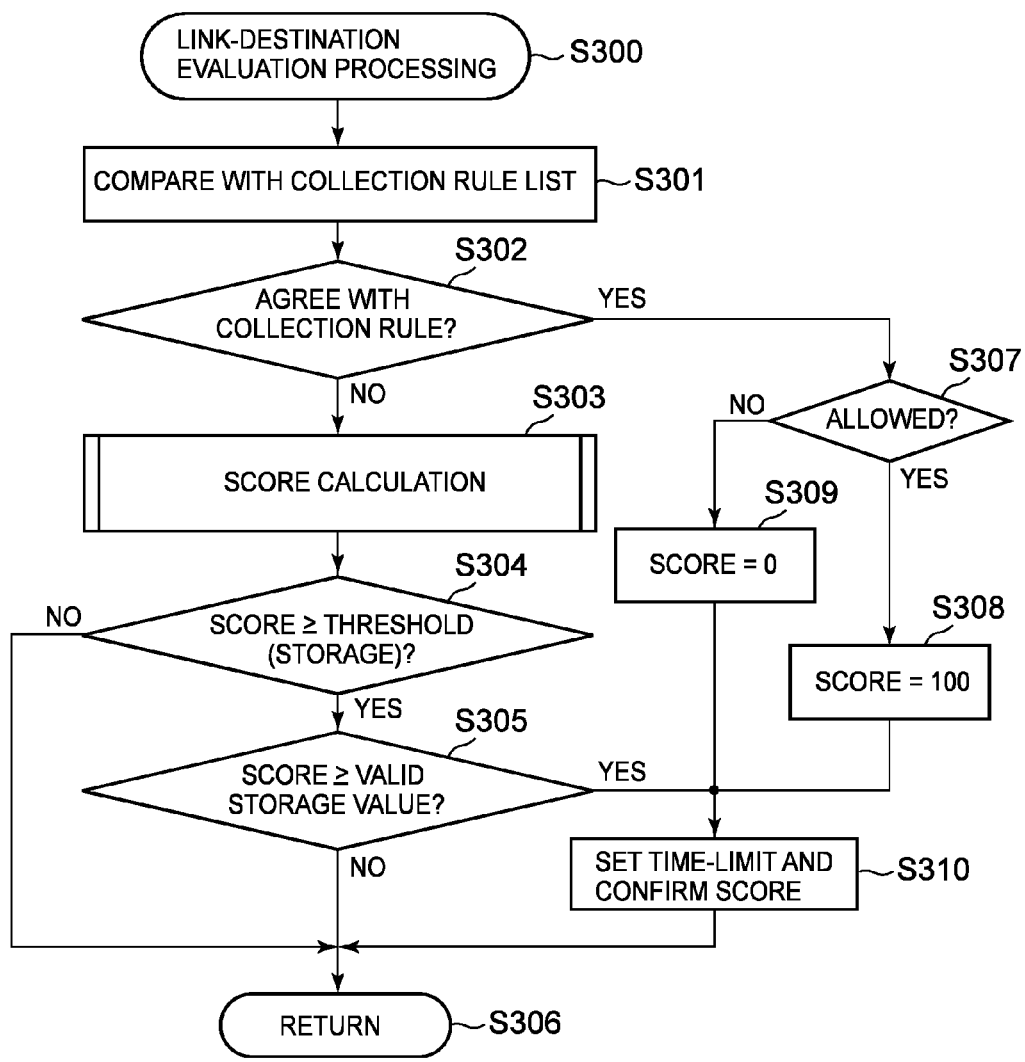
FIG. 9 is a flowchart of a link-destination evaluation processing executed by a link-destination evaluation unit according to Embodiment 1 of the present invention.

Referring to FIGS. 7 to 9, the following describes the details of the collection processing according to Embodiment 1 of the present invention. FIG. 7 is a flowchart of the collection processing executed by the crawler unit 30 according to Embodiment 1 of the present invention. The processing illustrated in FIG. 7 starts at Step S100 in response to an external instruction from an administrator or the like or in response to predetermined schedule or the arrival of a time specified by a predetermined interval.

The present embodiment exemplifies in the below the case where webpages are collectively collected in accordance with schedule for the sake of simplicity, where schedule used for the rounding collection method is not an especially limited. For instance, in another embodiment it may be configured that, for each URL, statistic information on updating frequency of a corresponding page is reflected, and a collection schedule time and date is set in accordance with the range of the set collection frequency, and rounding for collection is performed continuously. In such a case, collection is performed with higher frequency and with priority for URLs included in a set explicitly designated in the collection rule setting data 100, whereas collection is performed with lower frequency for URLs with an intermediate score set thereto.

At Step S101, the crawler unit 30 acquires records one by one from the rounding-destination table 110, and acquires a URL as a candidate for the collection target, a calculated score, and a time-limit set for the score. At Step S102, the crawler unit 30 compares the obtained score with a threshold (collection) 100*c* for inclusion in the collection target so as to make a judgment whether an information resource indicated by the URL of the acquired record is to be the collection target or not. If it is judged that the information resource should be the collection target (YES) at Step S102, the processing proceeds to Step S103. At Step S103, the current time is compared with the time-limit set for the score so as to make a judgment whether the score of the information resource is valid or not and the information resource is valid for the collection target or not.

If at Step S103 the current time is within the time-limit, and it is judged the score is valid (YES), the processing proceeds to Step S104. At Step S104, the crawler unit 30 calls the page processing unit 32 and passes the processing thereto with the obtained URL and score as arguments. When the processing is returned from the page processing unit 32, the crawler unit 30 judges whether there are unprocessed records or not at Step S105.

At Step S105, if it is judged that there are still unprocessed records (YES), then the processing is looped to Step S101 to repeat the processing until all records are processed. On the other hand, if it is judged that there are no unprocessed records (NO), the processing proceeds to Step S106 to end the collection processing.

On the other hand, if at Step S102 the score is lower than the threshold (collection) 100*c* for inclusion in the collection target and it is judged that the information resource should not be the collection target (S102: NO), and if at Step S103 the current time is beyond the time-limit and the score is invalid (S103: NO), then processing proceeds to Step S107. At Step S107, a page deletion processing of the information resource corresponding to the record is performed. In this page deletion processing, when the webpage was collected in the past, the crawler unit 30 deletes the page data from the page storage unit 26 or sets the page data outside the indexing target. Preferably the record with a score of an expired time-limit is deleted from the rounding-destination table 110.

The present embodiment is configured so that URLs having scores equal to or greater than the threshold (storage) 100*d* and, thus, being candidates for the collection target are registered as records in the rounding-destination table 110, and when a record is read out, the record is judged as the collection target if its score is equal to or greater than the threshold (collection) 100*c*. However, in another possible embodiment, only URLs having scores equal to or greater than the threshold (collection) 100*c* and, thus, being the collection target may be registered in the rounding-destination table 110, and when a record is read out, a confirmation processing of the time-limit thereof may simply be performed.

FIG. 8 is a flowchart of the page processing executed by the page processing unit 32 according to Embodiment 1 of the present invention. The processing illustrated in FIG. 8 is called by the crawler unit 30 at Step S104 of the collection processing of FIG. 7, and starts at Step S200. At Step S201, the page processing unit 32 issues an acquisition request to the passed URL, and acquires a webpage from the information resource. At Step S202, the page processing unit 32 identifies a hyperlink embedded in the webpage by HTML syntax analysis to extract a link-destination URL.

At Step S203, the page processing unit 32 judges whether there are unprocessed links or not. If at Step S203 it is judged that there are unprocessed links (YES), the processing proceeds to Step S204. At Step S204, the page processing unit 32 calls the link-destination evaluation unit 34 and passes the processing thereto with the score of the webpage at the link-origin as an argument. Then when the processing is returned from the link-destination evaluation unit 34, the processing is looped to Step S203 to repeat the processing for all of the extracted hyperlinks. On the other hand, if at Step S203 it is judged that processing has been finished for all links included in the acquired webpage (NO), the processing proceeds to Step S205 to end the page processing, and the processing is returned to the collection processing of FIG. 7 that called the page processing.

FIG. 9 is a flowchart of the link-destination evaluation processing executed by the link-destination evaluation unit 34 according to Embodiment 1 of the present invention. The processing illustrated in FIG. 8 is called by the page processing unit 32 at Step S204 of the page processing of FIG. 8, and starts at Step S300. At Step S301, the link-destination evaluation unit 34 compares each item of the collection rule list designated explicitly in the collection rule setting data 100 with the passed URL. At Step S302, the link-destination evaluation unit 34 judges whether the collection rule list includes an item agreeing with the URL or not.

At Step S302, if it is judged that the collection rule list includes an item agreeing with the URL (YES), the processing proceeds to Step S307. At Step S307, the link-destination evaluation unit 34 judges whether the URL matches with an allowed address pattern and the collection thereof is allowed explicitly or not. If it is judged that the URL is allowed explicitly at Step S307 (YES), the processing proceeds to Step S308, where the maximum score "100" is allocated to the information resource indicated by the link-destination URL, and the processing proceeds to Step S310. On the other hand, at Step S307 if it is judged the URL is forbidden explicitly (NO), the processing proceeds to Step S309, where the minimum score "0" is assigned to the information resource indicated by the link-destination URL, and the processing proceeds to Step S310.

On the other hand, if it is judged at Step S302 that the collection rule list does not include an item agreeing with the URL (NO), the processing proceeds to Step S303. At Step S303, the link-destination evaluation unit 34 subtracts a predetermined subtraction amount based on the score assigned to the webpage to calculate a score for an information resource indicated by the link-destination URL of the evaluation target. At Step S304, the link-destination evaluation unit 34 compares the calculated score with the threshold (storage) 100d for inclusion in candidates for the collection target. If at Step S304 it is judged that the calculated store is equal to or greater than the threshold (storage) 100d (YES), the processing proceeds to Step S305.

At Step S305, the link-destination evaluation unit 34 refers to the rounding-destination table 110 to try to acquire the score corresponding to the link-destination URL and the time-limit thereof, and to make a judgment whether or not the calculated score is equal to or greater than a storage value of a possible valid score. If at Step S305 it is judged that the calculated score is equal to or greater than a storage value of a possible valid score (YES), the processing proceeds to Step S310.

On the other hand, if at Step S304 it is judged that the calculated score is less than the threshold (storage) 100d (S304: NO), and at Step S305 it is judged that the calculated score is less than the storage value of the possible valid score (NO), the processing proceeds to Step S306, where the link-destination evaluation unit 34 discards the score calculated in this flow to end the link-destination evaluation processing and returns the processing to the page processing illustrated in FIG. 8 that called the link-destination evaluation processing.

At Step S310, the time-limit is set and the score calculated at Step S308, at Step S309, or at Step S303 is confirmed to add or update the record corresponding to the rounding-destination table 110 appropriately. Then the processing proceeds to Step S306 to end the link-destination evaluation processing and return the processing to the page processing illustrated in FIG. 8 that called the link-destination evaluation processing.

As described above, according to the processing of Embodiment 1, even for an URL that is outside the specification of the collection rule designated explicitly by the administrator, for example, such an URL can be associated with a score that reflects a distance from a set of qualified addresses as the collection target specified by the collection rule so that the matching webpage can be included in the collection target, and therefore the collection range can be expanded to an appropriate range in accordance with a relevance depending on a link between the webpages. Especially, Embodiment 1 is configured so that a site with a high degree of relevance can be collected even when the administrator does not recognize it, and therefore the range of the collection target can be managed and controlled effectively without increasing the number of items of the set collection rule and the details thereof, thus making it easy for the administrator to set and mange the collection rule.

In another possible embodiment, when a URL as a candidate for the collection target outside the specification of the collection rule is found at Step S310 illustrated in FIG. 9, an address pattern including at least a part of a domain name and a path included in the URL is kept as a candidate for an item to be added to the collection rule, which can be presented when the administrator changes the setting of the rounding-destination table 110 manually. For instance, when "http://www.docs.example.com/form/required.html" is found as a candidate for the collection target, "http://www.docs.example.com/form/*" or "http://www.docs.example.com/*" can be kept for the presentation as a candidate to be added to the allowed address pattern. The allowed address pattern kept as the additional candidate may be displayed later on a graphical user interface, for example, to be presented to the administrator when the administrator manually performs setting.

Embodiment 2

In the above-described Embodiment 1, a subtraction amount to calculate a score is fixed. The following describes Embodiment 2 where a subtraction amount is changed in accordance with a site characteristic of the link-destination URL, thus expanding the collection range more flexibly. Note that a search system 10 and a search server 20 of Embodiment 2 have the same configuration as that of Embodiment 1 for the most part, and therefore the following describes mainly a different part.

Figure 10:
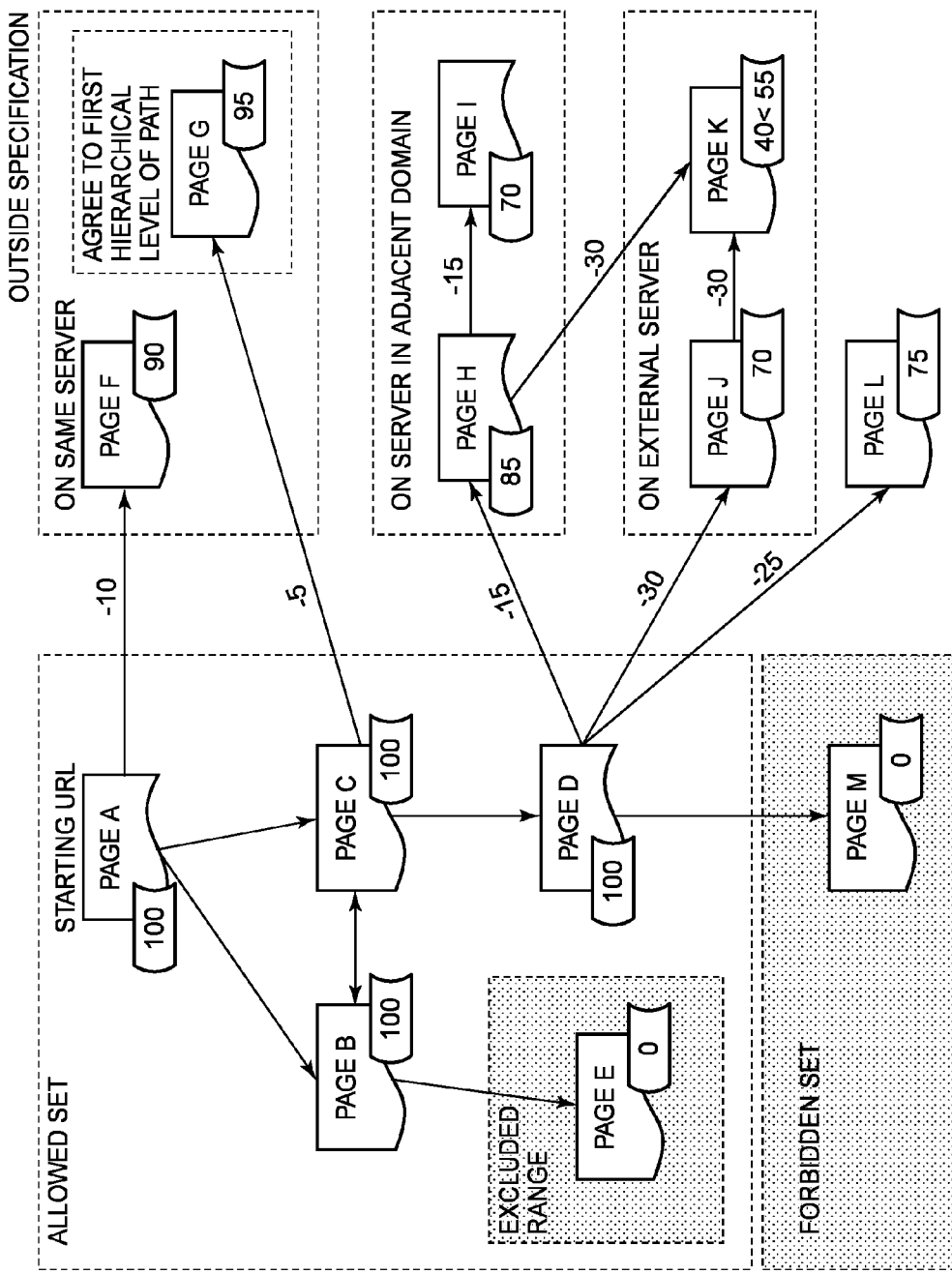
FIG. 10 schematically illustrates a score evaluation method for a link-destination information resource according to Embodiment 2 of the present invention.

Referring now to FIG. 10, the following describes a score evaluation method for a link-destination information resource in accordance with a site characteristic. FIG. 10 schematically illustrates the score evaluation method for a link-destination information resource according to Embodiment 2. Similarly to FIG. 5, FIG. 10 illustrates a plurality of pages A to M as information resources indicated by URLs. Each of these pages A to M exists on one of a region for an allowed set, a region for a set excluded, a region for a forbidden set, a region of a set of URLs on the same server as that for URLs included in the allowed set, a region of a set of URLs on a server in a domain adjacent to the server of URLs included in the allowed set, a region of a set of URLs on a server outside an in-house network 12, and other region beyond the specification.

In the example illustrated in FIG. 10, similarly to FIG. 5, the maximum score indicated by "100" is allocated to each of pages A to D as elements of the allowed set. On the other hand, the minimum score indicated by "0" is allocated to each of pages E and M included in the set specified by the forbidden address pattern. Similarly to Embodiment 1, a set obtained by removing the set specified by the forbidden address pattern from the set specified by the allowed address pattern makes up a set of qualified URLs for the collection target specified explicitly by the collection rule. For pages F to L existing outside the regions specified by the items in the collection rule, intermediate values are calculated by subtracting a predetermined subtraction amount from the score of the allowed set pages.

In Embodiment 2, as illustrated in FIG. 10, a plurality of regions exist in accordance with their site characteristics outside the region specified as a set of qualified URLs for the collection target. One of classifications of pages in accordance with a site characteristic includes a page whose information resource is hosted by a server with a domain name included in the allowed address pattern (in the example of FIG. 10, pages F and G). Since the page belonging to this classification has an information resource on the same server as that of the URLs of the allowed set designated explicitly as the collection target, the subtraction amount therefor can be decreased (e.g., to "10") when a score for this page as the link-destination is evaluated.

As a page on the same server, there may be a case where an allowed address pattern matching not only at a domain name of a server but also at a part of a path exists. In such a case, when a score for this page as a link-destination is evaluated, the subtraction amount can be decreased (e.g., to "5" in the case of matching up to a first hierarchical level).

Another classification of pages in accordance with a site characteristic includes a page whose information resource is hosted by a server with a domain name having a parent name that exists in the allowed address pattern (in the example of FIG. 10, pages H and I). The page belonging to this classification is an information resource on a server in a domain adjacent to the server of URLs included in the allowed set, and therefore when a score for this page as the link-destination is evaluated, for example, the subtraction amount can be decreased (e.g., to "15"). Herein, the method for judging an adjacent domain is not limited especially, and a degree of agreement with all parent domains may be judged, a degree of agreement of parent domains except for the uppermost domain may be judged, or the subtraction amount may be changed in accordance with a degree of the agreement of a parent domain portion.

Still another classification of pages in accordance with a site characteristic includes a page on an external server whose information resource is hosted by a server with a parent domain that does not agree with a parent domain of the search server 20 (in the example of FIG. 10, pages J and K). The page belonging to this classification is an information resource on a server external to the in-house network 12 where the search server 20 belongs, and therefore when a score for this page as the link-destination is evaluated, for example, the subtraction amount can be increased (e.g., to "30").

As for a page that does not belong to any one of the above-stated classifications in accordance with a site characteristic, e.g., as for page L, the subtraction amount therefor can be a default value (e.g., "25"). Although not illustrated in FIG. 10, in Embodiment 2, the subtraction amount can be also changed in accordance with the number of links included in a webpage as a link-origin.

The processing flow of the collection processing, the page processing, and the link-destination evaluation processing according to Embodiment 2 may be generally similar to the processing flow illustrated in FIGS. 7 to 9 of Embodiment 1. However, Embodiment 2 is different from Embodiment 1 in that at Step S303 of FIG. 9 a score calculation processing is called as illustrated in FIG. 11.

Figure 11:
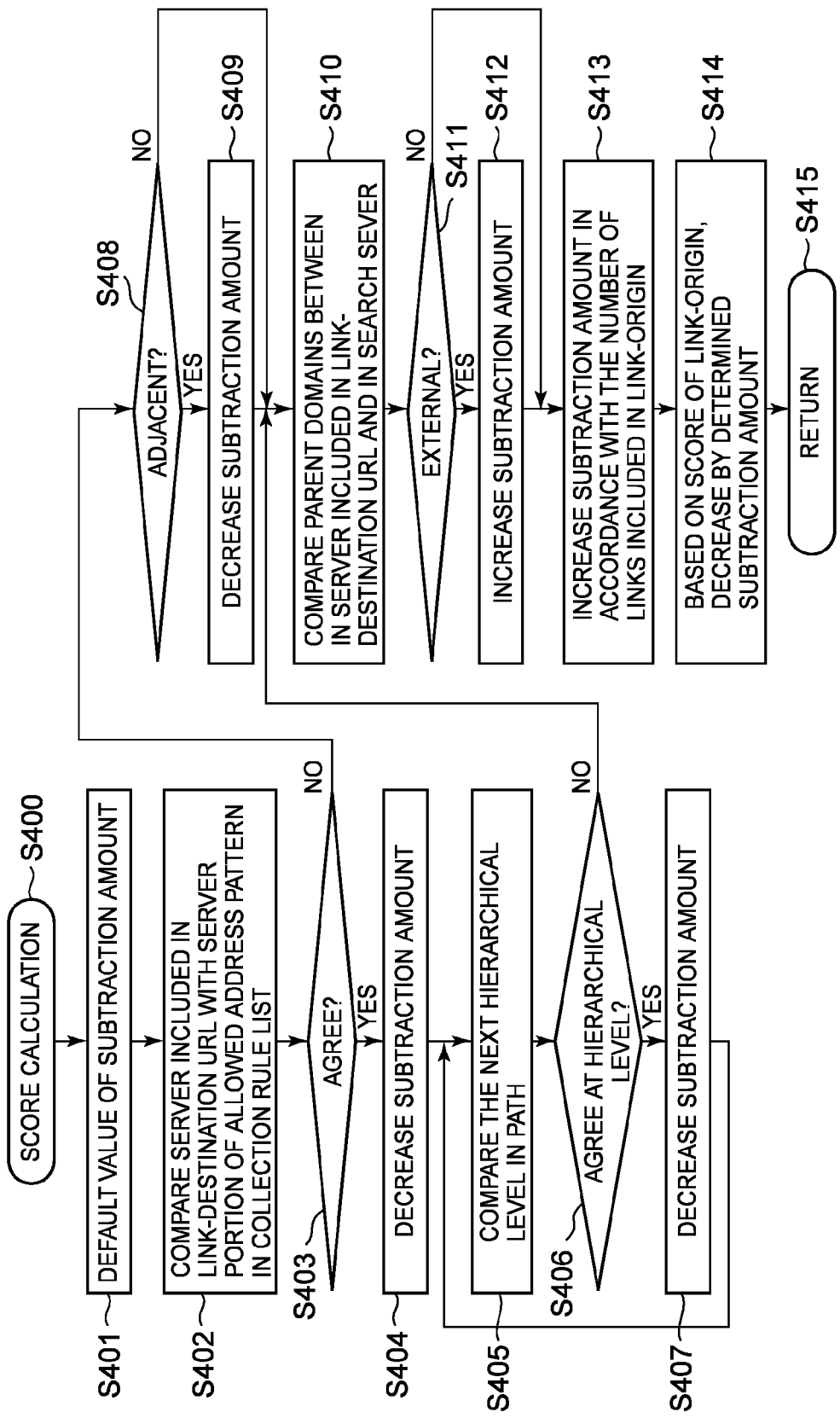
FIG. 11 is a flowchart of a score calculation processing executed by a link-destination evaluation unit according to Embodiment 2 of the present invention.
Figure 12:
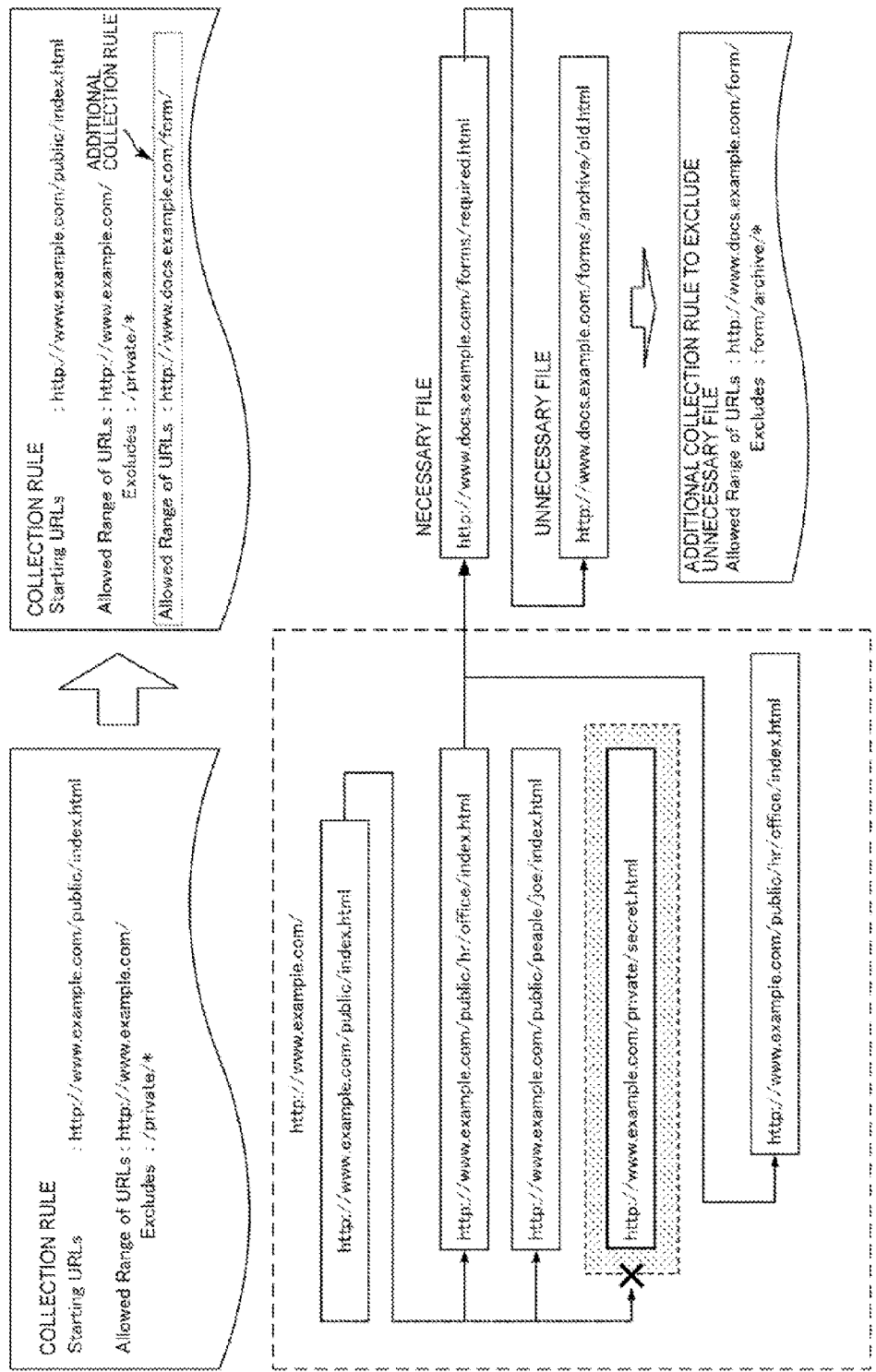
FIG. 12 illustrates the procedure of rounding for collection according to the conventional technique, and a collection rule manually added for setting.
Figure 13:
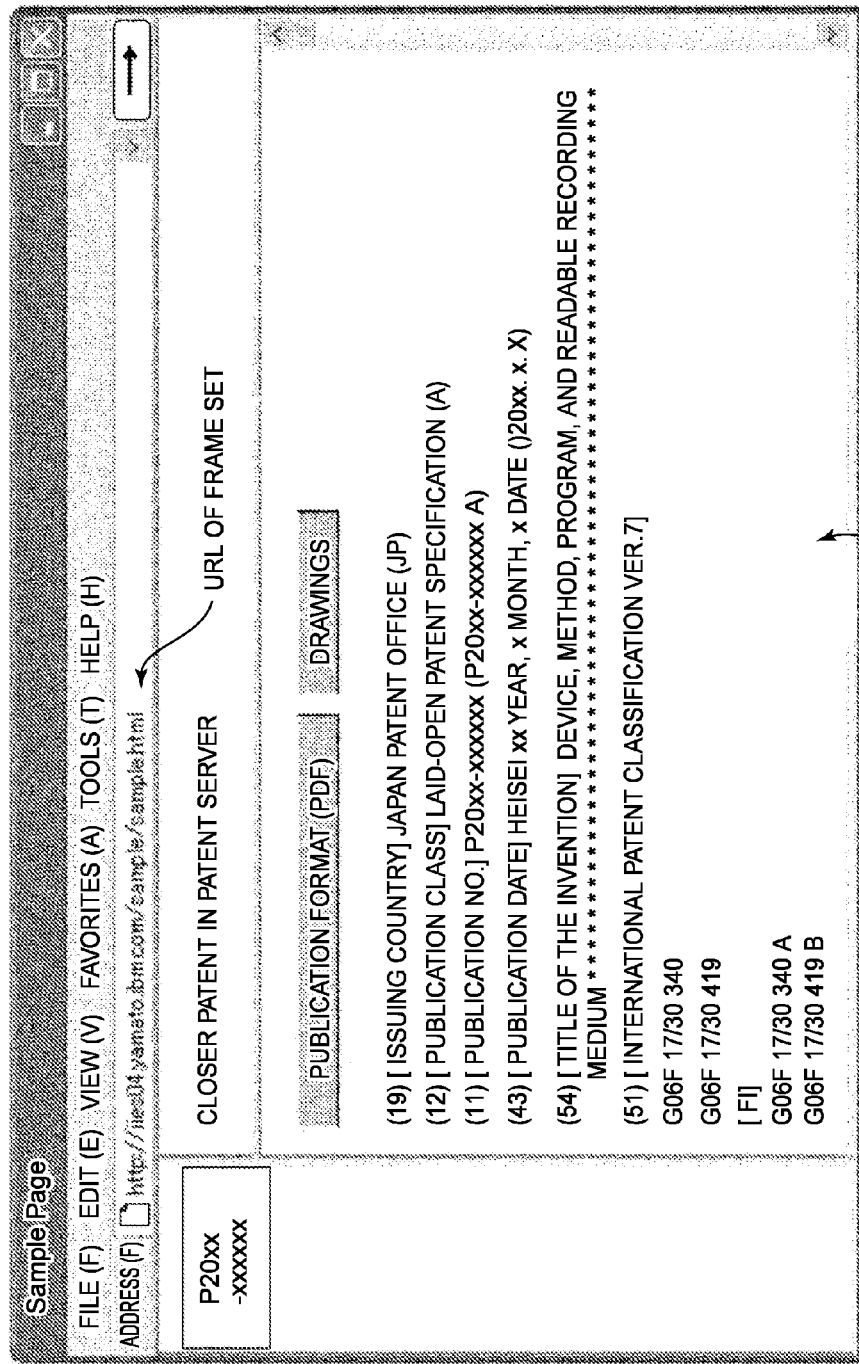
FIG. 13 illustrates a webpage including a frame in a page on another server according to the conventional technique.
Figure 14:
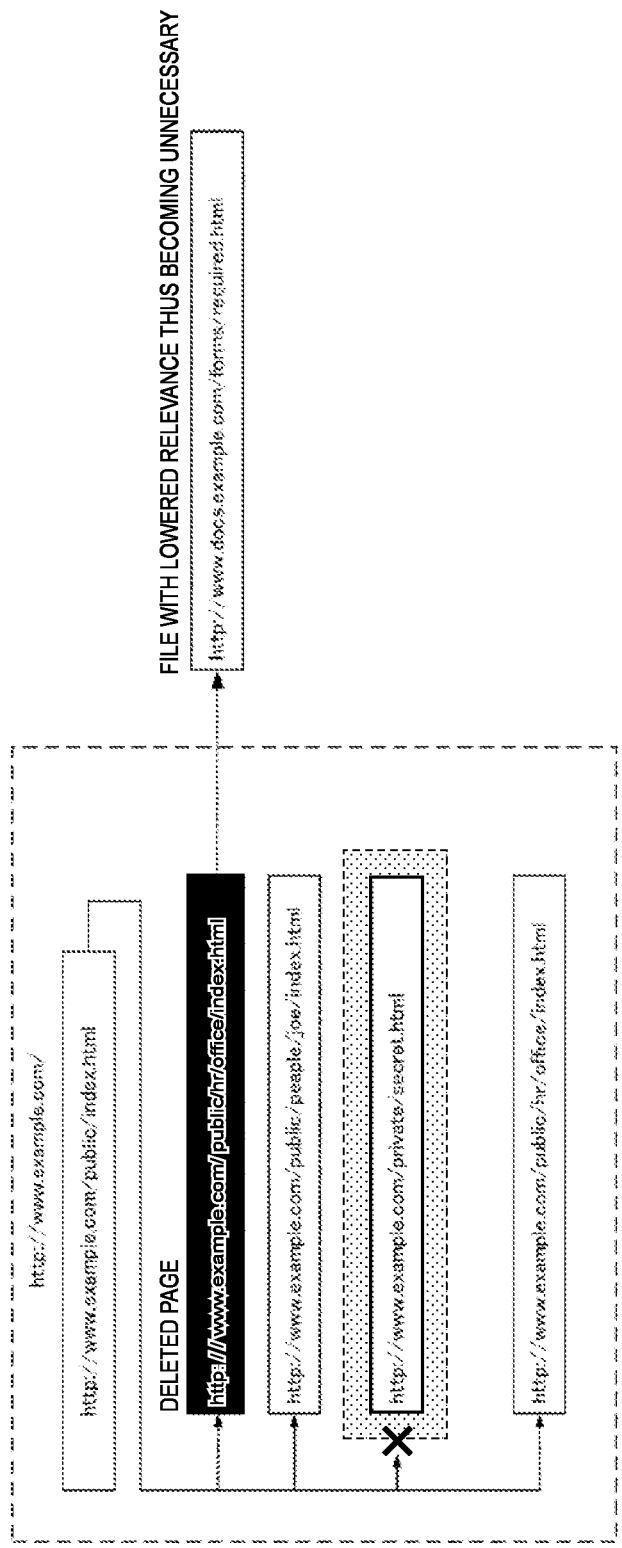
FIG. 14 illustrates when a page collected before is deleted according to the conventional rounding for collection technique.

Referring to FIG. 11, the following describes the score calculation processing in detail. FIG. 11 is a flowchart of the score calculation processing executed by the link-destination evaluation unit 34 according to Embodiment 2 of the present invention. The processing of FIG. 11 is called by the processing of Step S303 illustrate in FIG. 9, and starts at Step S400.

At Step S401, the link-destination evaluation unit 34 sets the subtraction amount at a default value (e.g., at "25"). At Step S402, the link-destination evaluation unit 34 compares a domain name of a server included in a URL as a link-destination with an allowed address pattern included in the collection rule list. At Step S403, the link-destination evaluation unit 34 makes a judgment whether a server with a domain name agreeing exists in the collection rule list or not.

If at Step S403 it is judged that an agreeing one exists (YES), the processing proceeds to Step S404. At Step S404, the link-destination evaluation unit 34 considers that the server included in the link-destination URL is identical with the allowed server, and decreases the subtraction amount (e.g., to 40%). At Step S405, the link-destination evaluation unit 34 compares a path portion of the link-destination URL with the agreeing allowed address pattern, and at Step S406 the link-destination evaluation unit 34 judges whether the path portion to the first hierarchical level agrees or not.

At Step S406, if it is judged that the path portion agrees to the first hierarchical level (YES), the processing proceeds to Step S407, and the link-destination evaluation unit 34 further decreases the subtraction amount (e.g., to 50%). Then the processing is looped again to Step S405, where a comparison is made for the next hierarchical level, and the processing is looped as long as agreement is obtained (Step S406: during YES). On the other hand, if it is judged that the hierarchical level does not agree at Step S406 (NO), the processing proceeds to Step S410.

Referring back to Step S403, if it is judged that a server with a domain name agreeing does not exist in the collection rule list (NO), the processing proceeds to Step S408. At Step S408, the link-destination evaluation unit 34 judges whether the server included in the link-destination URL is in a domain adjacent to the server in the collection rule list or not.

If at Step S408 it is judged that the server is in an adjacent domain (YES), at Step S409 the link-destination evaluation unit 34 decreases the subtraction amount (e.g., to 60%), and then processing proceeds to Step S410. On the other hand, if at Step S408 it is judged that the server is not in an adjacent domain (NO), the processing directly proceeds to Step S410.

At Step S410, the link-destination evaluation unit 34 further compares a parent domain name of the server included in the link-destination URL with a parent domain allocated to the search server 20, and at Step S411 the link-destination evaluation unit 34 judges whether the server included in the link-destination URL is an external server of the in-house network 12 or not. If at Step S411 it is judged that the server is an external server (YES), the processing proceeds to Step S412, where the link-destination evaluation unit 34 increases the subtraction amount (e.g., by 20%), and then processing proceeds to Step S413. On the other hand, if at Step S411 it is judged that the server belongs to the in-house network 12 (NO), the processing directly proceeds to Step S413.

At Step S413, the subtraction amount is subsequently increased in accordance with the number of links L included in the webpage of the link-origin (e.g., increased by the number of links L). This is for lowering the evaluation of a score for a link-destination from a webpage such as bookmark or link collection, thus making the link-destination harder to be included in the collection target.

At Step S414, the subtraction amount determined by the processing from Step S400 to Step S413 is subtracted from the score for the webpage of the link-origin to calculate the final score, and at Step S415 the processing is returned to the link-destination processing of FIG. 9 that called this processing.

According to the score evaluation method described referring to FIGS. 10 and 11, the score can be determined by subtracting the subtraction amount in accordance with a site characteristic for each link passing from a page included in a set of URLs qualified for the collection target to the evaluation target page. That is, when the subtraction amount that is a difference in score between the link-origin and the link-destination is associated with a link length, the value can reflect a distance determined by the total sum of link lengths of links passing from the set of qualified URLs to the evaluation target page. In the example illustrated in FIG. 10, the link length, i.e., the subtraction amount can be varied in accordance with the site characteristic of the link-destination represented as a character string of the URL, and the setting amount to increase or decrease these subtraction amounts is adjusted, whereby the collection range can be expanded as the administrator intends.

As described above, according to the embodiments of the present invention, an information collection apparatus, an information collection method, and a program, as well as a search engine that searches information resources collected can be provided, which are capable of flexibly expanding its collection range to an appropriate range without making the setting of a collection rule by an administrator complicated, while suppressing a decrease in the collection efficiency of a collection target designated explicitly, and capable of coping with a change in environment to change a relevance between information resources greatly such as a change in the site configuration.

In order to make it easy to understand the present invention, the respective functional units and the processing by these functional units have been described so far. In the present invention, however, in addition that a certain functional unit executes a certain processing as described above, a function for executing the above-described processing may be assigned to any functional unit with consideration given to a processing efficiency and an efficiency of programming for implementation.

The above-stated functions of the present embodiment may be implemented by a device executable program described in an object-oriented programming language such as C++, Java®, Java® Beans, Java® Applet, Java® Script, Perl or Ruby, or a database language such as SQL, and such a program may be stored in a device readable recording medium and may be distributed or transmitted for distribution.

While the present invention has been described by way of certain embodiments so far, the present invention is not limited to the above-described embodiments, and another embodiment, addition, change and deletion are all possible as long as they are obvious to those skilled in the art. Any embodiment will be within the scope of the present invention as long as the effects of the present invention can be obtained therefrom.

What is claimed:

1. A method comprising:
providing a collection rule defining a set of qualifying addresses;
acquiring data from an information resource over a network to extract link destination addresses in the data;
determining whether the link destination addresses are included in the set of qualifying addresses by determining whether the link destination addresses comprise addresses in an allowed set explicitly allowed by the collection rule, explicitly excluded by the collection rule, and outside of the allowed set;
assigning scores to the link destination addresses based on the determination of whether the link destination addresses are in the set of qualifying addresses, which is based on the determination of whether the link destination addresses comprise addresses explicitly allowed, explicitly excluded, or outside of the allowed set;
determining from the scores of the link destination addresses whether the link destination addresses are to be included in a collection target; and
accessing data at the link destination addresses included in the collection target to store for searching.

2. The method of claim 1, wherein the qualifying addresses comprise the allowed set of addresses comprising at least one of the addresses explicitly allowed and not explicitly excluded by the collection rule.

3. The method of claim 2, wherein a first score is assigned to link destination addresses explicitly allowed by the collection rule, a second score is assigned to link destination addresses outside of the allowed set, and a third score is assigned to link destination addresses explicitly excluded by the collection rule.

4. The method of claim 3, wherein the first score is greater than the second score and the second score is greater than the third score.

5. The method of claim 2, wherein determining whether the link destination addresses are to be included in the collection target comprises determining whether the score of the link destination addresses is greater than a score threshold, wherein the link destination addresses included in the collection target include link destinations addresses allowed by the collection rule and outside of the allowed set.

6. The method of claim 2, wherein the link destination addresses are included in a first accessed page and subsequently accessed pages linked to by link destination addresses in the first accessed page and the subsequently accessed pages, wherein the subsequently accessed pages are directly or indirectly linked to the first accessed page by link destination addresses.

7. The method of claim 2, wherein the score assigned to the link destination addresses is further adjusted based on whether the link destination addresses are in data acquired from one of the link destination addresses explicitly allowed by the collection rule or in data acquired from one of the link destination addresses outside of the allowed set.

8. The method of claim 7, wherein adjusting the score comprises subtracting an amount from the score of each of the link destination addresses in data acquired from one of the link destination addresses outside of the allowed set.

9. The method of claim 7, wherein at least one of the link destination addresses comprises a multi-linked link destination address referenced in first data at a first link destination address explicitly allowed by the collection rule and in second data at a second link destination address outside of the allowed set, and wherein the score assigned to the multi-linked destination address comprises a maximum of the scores assigned based on the link destination addresses included in the first data and the second data.

10. The method of claim 2, wherein adjusting the score for one of the link destination addresses outside of the allowed set comprises:
   determining a characteristic of an addressed server addressed by the link destination address; and
   adjusting the score for the link destination address based on the determined characteristic of the addressed server addressed by the link destination address.

11. The method of claim 10, wherein the determined characteristic is the addressed server including addresses allowed by the collection rule, the addressed server being in an adjacent domain to a domain of the server including addresses allowed by the collection rule, and the addressed server being in a domain external to the domain of the server including addresses allowed by the collection rule.

12. The method of claim 2, wherein the operations further comprising:
   assigning a time limit to each score, wherein the scores of link destination addresses whose time limit indicates that the score has expired are not included in the collection target.

13. The method of claim 2, further comprising:
   in response to determining that the time limit for the score for one link destination address has expired, determining whether the expired link destination address is included in data that has not been deleted; and
   recalculating the score for the link destination addresses whose time limit has expired and that are included in data that has not been deleted.

14. The method of claim 1, wherein storing the data at the link destination addresses for searching comprises including information on data at the link destination addresses in a search index to allow searching for the data at the link destination addresses, further comprising:
   receiving a search request from a client;
   processing the search index to determine link destination addresses having data satisfying the search request;
   ranking the determined link destination addresses according to their assigned scores; and
   returning a search result to the client of the determined link destination addresses ranked according to their assigned scores.

15. The method of claim 2, wherein the operations further comprising:
   maintaining as candidates for items to be added to the collection rule link destination addresses outside of the allowed set whose score satisfies criteria to be included in the collection target.

16. A non-transitory computer readable recording medium including a program executed to perform operations, the operations comprising:
   providing a collection rule defining a set of qualifying addresses;
   acquiring data from an information resource over a network to extract link destination addresses in the data;
   determining whether the link destination addresses are included in the set of qualifying addresses by determining whether the link destination addresses comprise addresses in an allowed set explicitly allowed by the collection rule, explicitly excluded by the collection rule, and outside of the allowed set;
   assigning scores to the link destination addresses based on the determination of whether the link destination addresses are in the set of qualifying addresses, which is based on the determination of whether the link destination addresses comprise addresses explicitly allowed, explicitly excluded, or outside of the allowed set;
   determining from the scores of the link destination addresses whether the link destination addresses are to be included in a collection target; and
   accessing data at the link destination addresses included in the collection target to store for searching.

17. The computer readable recording medium of claim 16, wherein the qualifying addresses comprise the allowed set of addresses comprising at least one of the addresses explicitly allowed and not explicitly excluded by the collection rule.

18. The computer readable recording medium of claim 17, wherein adjusting the score for one of the link destination addresses outside of the allowed set comprises:
   determining a characteristic of an addressed server addressed by the link destination address; and
   adjusting the score for the link destination address based on the determined characteristic of the addressed server addressed by the link destination address.

19. A system in communication with a network having information resources, comprising:
   a processor; and
   a computer readable medium having a program executed by the processor to perform operations, the operations comprising:
   providing a collection rule defining a set of qualifying addresses;
   acquiring data from an information resource over a network to extract link destination addresses in the data;
   determining whether the link destination addresses are included in the set of qualifying addresses by determining whether the link destination addresses comprise addresses in an allowed set explicitly allowed by the collection rule, explicitly excluded by the collection rule, and outside of the allowed set;
   assigning scores to the link destination addresses based on the determination of whether the link destination addresses are in the set of qualifying addresses, which is based on the determination of whether the link destination addresses comprise addresses explicitly allowed, explicitly excluded, or outside of the allowed set;
   determining from the scores of the link destination addresses whether the link destination addresses are to be included in a collection target; and
   accessing data at the link destination addresses included in the collection target to store for searching.

20. The system of claim 19, wherein the qualifying addresses comprise the allowed set of addresses comprising at least one of the addresses explicitly allowed and not explicitly excluded by the collection rule.

21. The system of claim 20, wherein adjusting the score for one of the link destination addresses outside of the allowed set comprises:
   determining a characteristic of an addressed server addressed by the link destination address; and
   adjusting the score for the link destination address based on the determined characteristic of the addressed server addressed by the link destination address.

* * * * *